(12) United States Patent
Weiss

(10) Patent No.: US 7,104,248 B2
(45) Date of Patent: Sep. 12, 2006

(54) METHOD FOR CONTROL OF AN HCCI INTERNAL COMBUSTION ENGINE IN EXCEPTIONAL SITUATIONS

(75) Inventor: Frank Weiss, Pentling/Grasslfing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/539,876

(22) PCT Filed: Oct. 17, 2003

(86) PCT No.: PCT/DE03/03455

§ 371 (c)(1),
(2), (4) Date: Jun. 14, 2005

(87) PCT Pub. No.: WO2004/055350

PCT Pub. Date: Jul. 1, 2004

(65) Prior Publication Data
US 2006/0065234 A1   Mar. 30, 2006

(30) Foreign Application Priority Data
Dec. 16, 2002   (DE)   ................................ 102 58 802

(51) Int. Cl.
*F02B 5/00* (2006.01)
*F02B 75/02* (2006.01)
*F02B 17/00* (2006.01)

(52) U.S. Cl. ...................... 123/305; 123/27 R; 123/295

(58) Field of Classification Search .............. 123/27 R, 123/295, 305
See application file for complete search history.

(56) References Cited

U.S. PATENT DOCUMENTS

| 5,875,743 | A  | 3/1999 | Dickey |
| 6,213,086 | B1 | 4/2001 | Chmela et al. |
| 6,237,562 | B1 | 5/2001 | Awasaka et al. |
| 6,260,520 | B1 | 7/2001 | Van Reatherford |
| 6,390,054 | B1 | 5/2002 | Yang |
| 2002/0007816 | A1 | 1/2002 | Zur Loye et al. |

FOREIGN PATENT DOCUMENTS

| AT | 5646 U | 9/2002 |
| DE | 199 27 479 A1 | 12/1999 |
| EP | 1 063 427 A2 | 12/2000 |
| WO | WO 98/10179 | 3/1998 |
| WO | WO 02/14665 A1 | 2/2002 |

*Primary Examiner*—Noah P. Kamen

(57) ABSTRACT

The invention relates to a method defining particular exceptional situations in the operation of an HCCI internal combustion engine, whereby an HCCI operation is either suppressed or enforced.

3 Claims, 3 Drawing Sheets

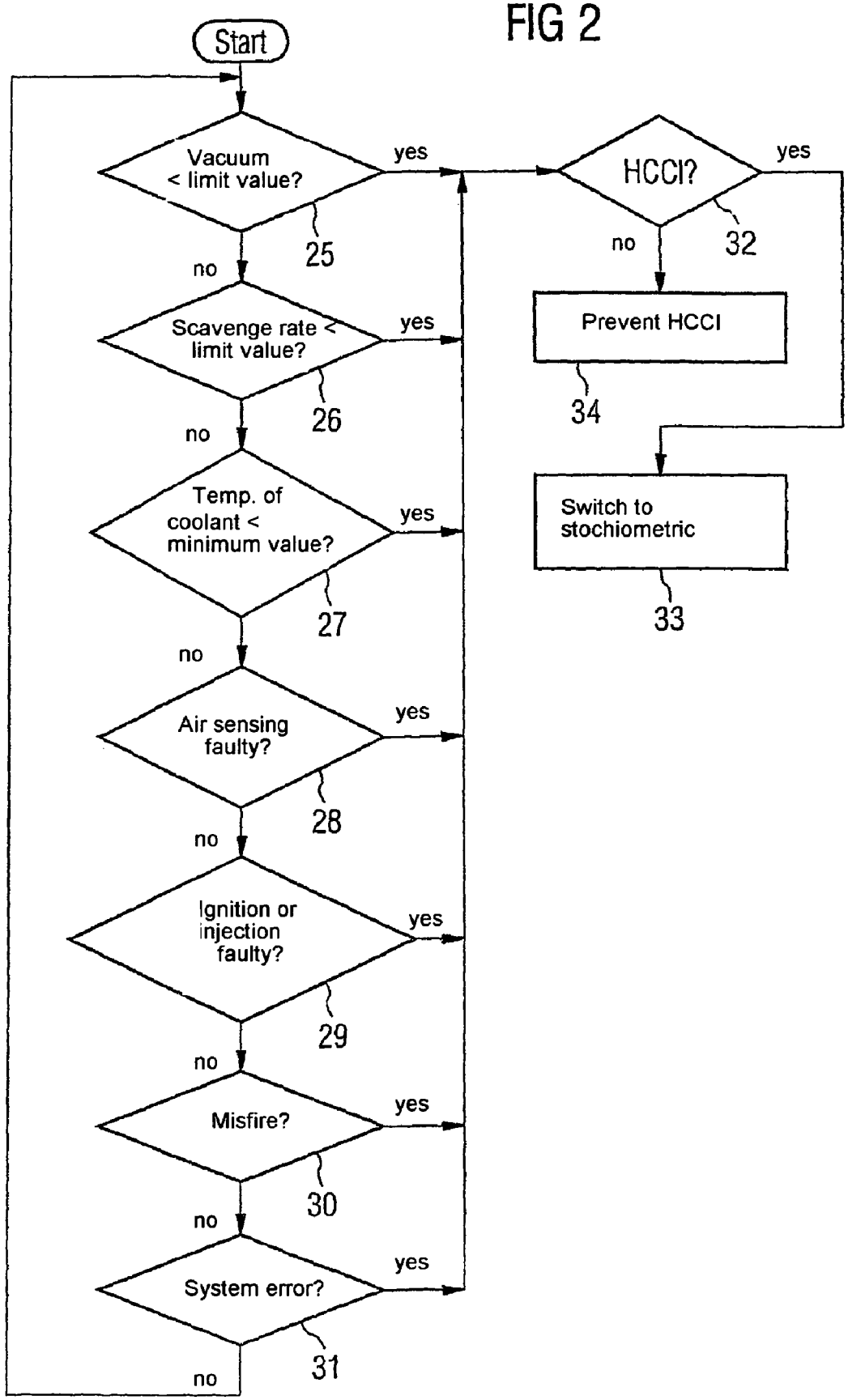

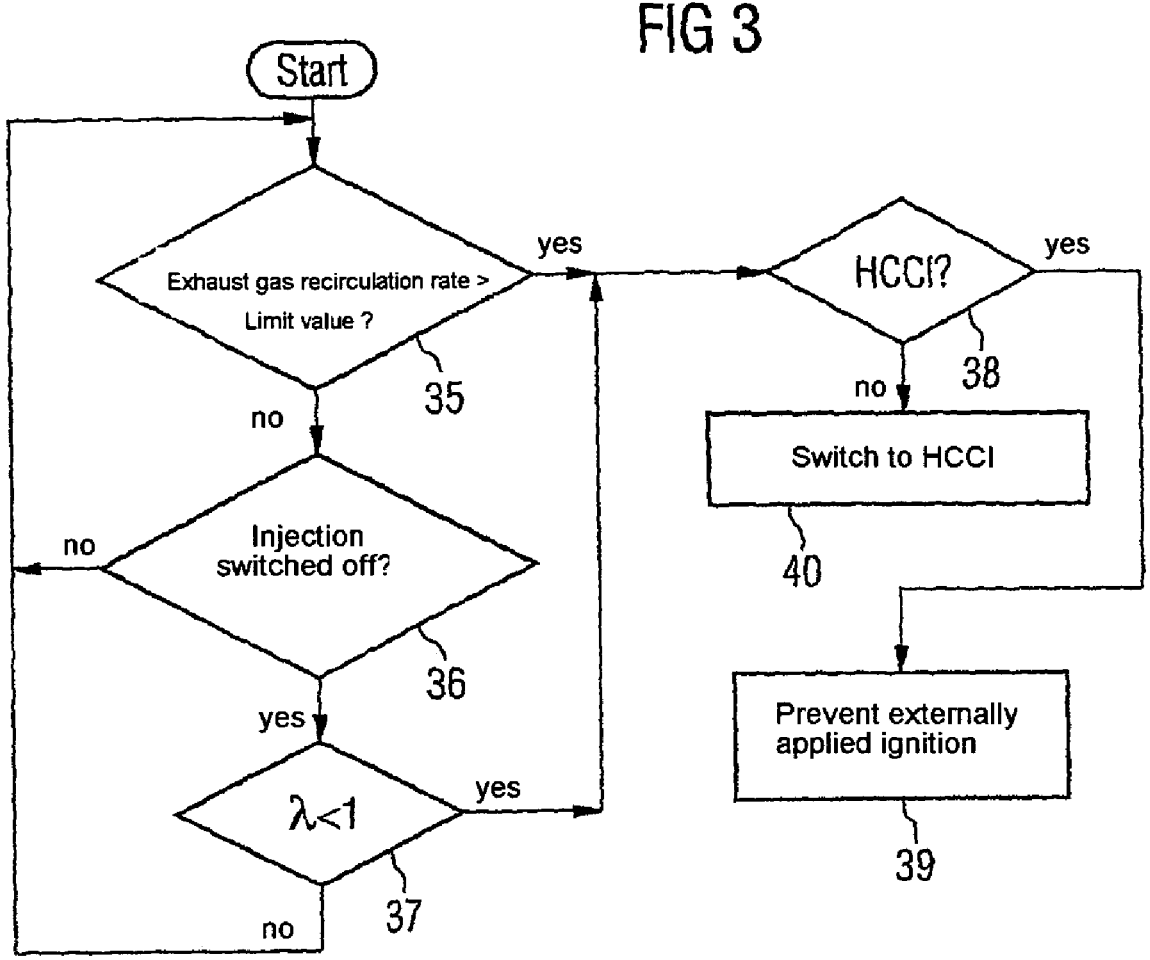

METHOD FOR CONTROL OF AN HCCI INTERNAL COMBUSTION ENGINE IN EXCEPTIONAL SITUATIONS

CROSS REFERENCE TO RELATED APPLICATION

This application is the US National Stage of International Application No. PCT/DE2003/003455, filed Oct. 17, 2003 and claims the benefit thereof. The International Application claims the benefits of German Patent application No. 10258802.3 DE filed Dec. 16, 2002, both of the applications are incorporated by reference herein in their entirety.

FIELD OF THE INVENTION

The present invention relates to a method for controlling the operation of an HCCI internal combustion engine which can be operated in the HCCI operating mode or in an operating mode using externally applied (spark) ignition and is switched over between said operating modes as a function of predefined operating parameters.

BACKGROUND OF THE INVENTION

When an internal combustion engine is operated in the HCCI (Homogeneous Charge Compression Ignition) operating mode, which is sometimes also referred to as CAI (Controlled Auto Ignition), ATAC (Active Thermo Atmosphere Combustion) or TS (Toyota Soken), the air-fuel mixture is ignited not by externally applied (spark) ignition, but by controlled self-ignition.

The HCCI combustion process can be triggered for example by a high proportion of hot residual exhaust gases and/or by a high compression and/or a high inlet air temperature. A prerequisite for the self-ignition is a sufficiently high energy level in the cylinder. Internal combustion engines which can be operated in the HCCI operating mode, which engines may be spark ignition engines or diesel engines, are known; see, for example, U.S. Pat. Nos. 6,260,520, 6,390,054, DE 199 27 479 and WO 98/10179.

Compared with a conventional combustion process based on externally applied (spark) ignition, HCCI combustion has the advantage of reduced fuel consumption and lower exhaust emissions. The internal combustion engine is therefore operated largely in the HCCI operating mode. However, in certain operating ranges such as, for example, at high engine speeds or under heavy load this is not possible, so that it is then necessary to switch over to an operating mode using externally applied (spark) ignition, in particular to a homogeneously stoichiometric mode of operation. The switchover between said operating modes is performed taking into account variables such as fuel consumption, exhaust emissions and drivability as a function of corresponding operating parameters such as, for example, load and engine speed.

During the operation of the internal combustion engine, however, exceptional situations can arise in which this customary "switchover strategy" leads to a disadvantageous mode of operation.

SUMMARY OF THE INVENTION

The object of the present invention is to specify a method for controlling the operation of an HCCI internal combustion engine of such a kind wherein the setting of the operating mode suitable for said exceptional situation is ensured even in exceptional situations.

This object is achieved by the method defined in the claims.

The present invention is based on the knowledge that in certain exceptional situations during the operation of the internal combustion engine the HCCI operating mode must be either prevented or enforced in order to avoid the malfunctions and damage contingent on the exceptional situation.

According to an alternative it is provided according to the invention that operation of the internal combustion engine in the HCCI operating mode is prevented if at least one of the following events occurs:

a) the vacuum in a vacuum reservoir of an associated braking system is less than a limit value due to an excessively high pressure in the intake duct of the internal combustion engine;

b) the scavenge rate of a fuel tank venting valve of an associated fuel tank venting system of the internal combustion engine is less than a limit value due to an excessively high pressure in the intake duct of the internal combustion engine;

c) the temperature of the coolant of a cooling circuit of the internal combustion engine is less than a minimum value;

d) the measurement of the air mass and/or the pressure in the intake duct of the internal combustion engine is defective;

e) the ignition of the air-fuel mixture and/or the fuel injection is defective;

f) ignition failures (misfires) or extremely uneven running of the internal combustion engine occur;

g) a safety device for monitoring the control functions of the internal combustion engine detects a system error.

If the internal combustion engine is in the HCCI operating mode when one of the events a) to g) occurs, it is switched to an operating mode using externally applied (spark) ignition, for example to a homogeneously stoichiometric or homogeneous lean mode of operation. If the internal combustion engine is already in an operating state using externally applied (spark) ignition when one of the events a) to g) occurs, a switchover to the HCCI operating mode is prevented.

According to the second alternative it is provided according to the invention that operation of the internal combustion engine in the HCCI operating mode is enforced if at least one of the following events occurs:

a) the recirculation rate of an exhaust gas recirculation system of the internal combustion engine is greater than a limit value as a result of a malfunction;

b) the air-fuel ratio ($\lambda$) is less than 1 in spite of the fuel injection being switched off.

By means of the measures according to the invention it is possible to prevent malfunctions of and damage to the internal combustion engine as well as dangerous states occurring in the event of the specified exceptional situations.

BRIEF DESCRIPTION OF THE DRAWINGS

Further details of the method according to the invention will be explained with reference to the drawings, in which:

FIG. 2 is a flowchart of a method for preventing an HCCI mode of operation in certain exceptional situations;

FIG. 3 is a flowchart of a method for enforcing an HCCI mode of operation in certain exceptional situations.

DETAILED DESCRIPTION OF THE INVENTION

Figure 1:
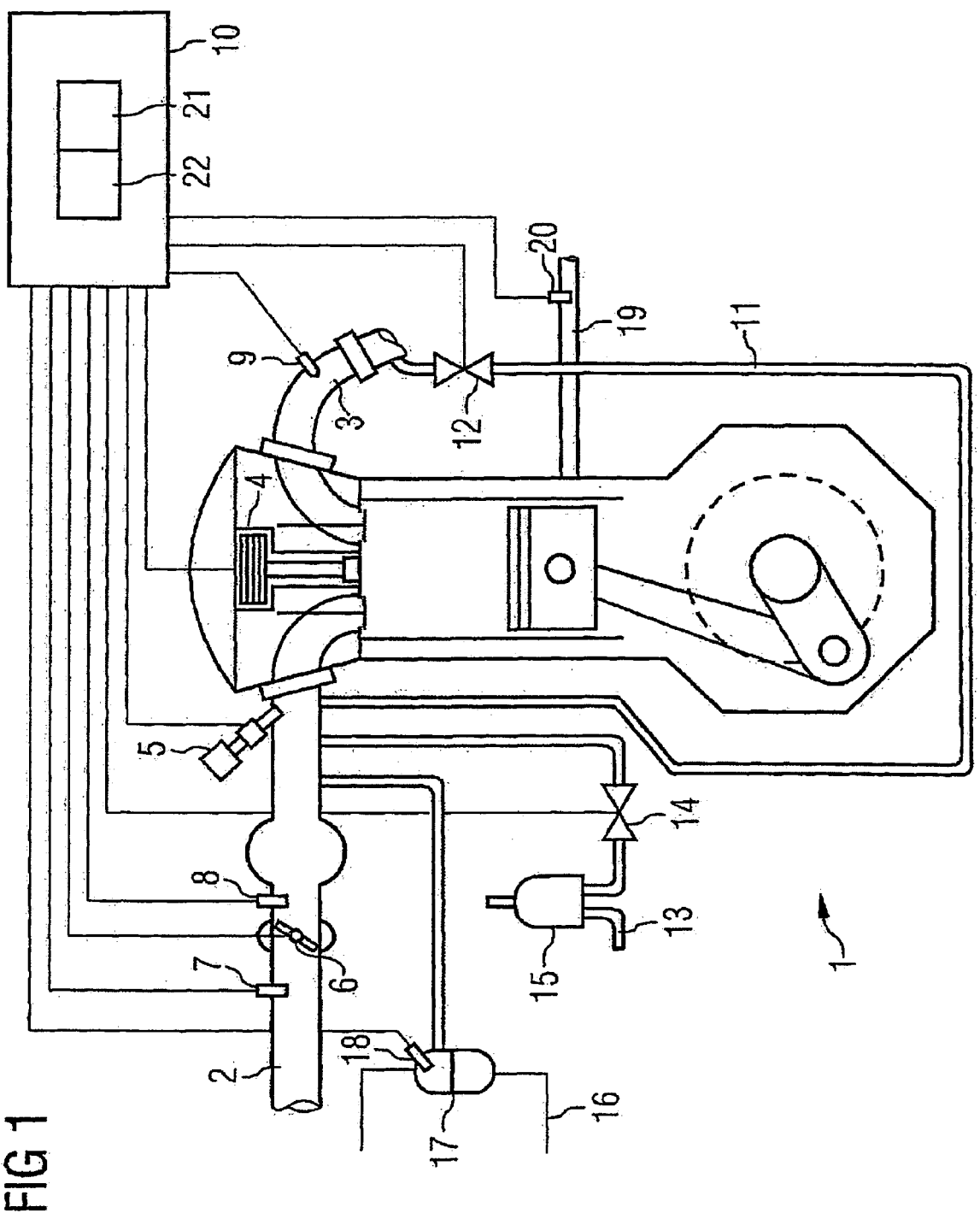
FIG. 1 shows a schematic representation of an HCCI internal combustion engine.

FIG. 1 shows in a highly schematized form a spark ignition type internal combustion engine 1 of the piston design type having at least one cylinder, an intake duct 2, an exhaust gas duct 3, an intake valve, an exhaust valve, an ignition device 4, a fuel injection valve 5, and a throttle valve 6. Arranged in the intake duct 2 are sensors 7, 8 for sensing the air mass or, as the case may be, the pressure in the intake duct. A sensor 9 in the form of a lambda probe is disposed in the exhaust gas duct 3 in order to sense the air-fuel ratio (λ).

Assigned to the internal combustion engine 1 is an electronic operation control device 10 which receives measurement signals from the sensor 7 to 9 as well as further sensors (not shown) and outputs actuating signals to the ignition device 4, the fuel injection valve 5, and the throttle valve 6 as well as further actuators of the internal combustion engine.

Certain other components of the internal combustion engine which are relevant to the present invention are also indicated schematically in FIG. 1, specifically an exhaust gas recirculation system 11 having an exhaust gas recirculation valve 12, a braking system 16 having a vacuum reservoir 17, and a pressure sensor 18 for sensing the vacuum in the vacuum reservoir 17, as well as a fuel tank venting system 13 having a fuel tank venting valve 14 and an activated charcoal reservoir 15.

The internal combustion engine 1 is embodied as an HCCI internal combustion engine which is normally operated in the HCCI operating mode under the control of the electronic operation control device 10 and is switched over to a mode of operation using externally applied (spark) ignition in certain operating states (e.g. high engine speed or heavy load) as a function of specific operating parameters (e.g. engine speed and load). Since such methods for controlling the operation of the internal combustion engine 1 are known (e.g. from the publications cited at the beginning), they will not be explored in further detail here.

Irrespective of the operating states occurring during normal operation of the internal combustion engine, however, exceptional situations can occur which would lead to a serious malfunction if no intervention is made by means of the method according to the invention.

Thus, for example, there are exceptional situations in which operation of the internal combustion engine 1 in the HCCI operating mode can lead to malfunctions and serious damage. The method according to the invention, which will now be explained in more detail with reference to the flow diagram of FIG. 2, prevents an HCCI operating mode if at least one of the following exceptional situations occurs:

a) Low vacuum in the vacuum reservoir 17: The HCCI operating mode requires a relatively high pressure in the intake duct 2, i.e. the throttle valve 6 is wide open essentially independently of the driver's wishes (pedal position). Under certain operating conditions this can lead to a state in which the vacuum reservoir 17 connected to the intake duct 2 in order to provide braking support to the braking system 16 can no longer be adequately vented.

Thus, if the vacuum in the vacuum reservoir 17 sensed by means of the pressure sensor 18 is less than a predefined limit value (step 25), the homogeneously stoichiometric operating mode is set (step 33).

If the vacuum in the vacuum reservoir 17 is greater than the limit value, then the program goes on to the next step 26.

b) Tank ventilation: The high pressure in the intake duct 2 that is set in the HCCI operating mode can further lead to the scavenge rate of the fuel tank venting valve 14 becoming so low that the fuel tank (not shown) is no longer adequately vented. Since the scavenge rate of the fuel tank venting valve 14 is continuously monitored in any case by means of a model by the electronic operation control device 10, the scavenge rate can be compared with a limit value. If the scavenge rate is less than the limit value (step 26), a transition is made to the homogeneously stoichiometric or even to the homogeneously lean mode of operation (step 33).

Otherwise the program proceeds to step 27.

c) Vehicle interior heating: In the HCCI operating mode a substantial improvement in the efficiency of the internal combustion engine is produced in certain operating ranges. There is then no longer so much waste heat available for heating the coolant of the cooling system 19. At low outside temperatures this then causes the coolant to heat up only relatively slowly, thus adversely affecting the operation of the vehicle interior heating system accordingly. Consequently, if the temperature of the coolant measured by means of the temperature sensor 20 does not increase to a minimum value (step 27), a switch is made to the homogeneously stoichiometric mode of operation (step 33).

Otherwise the program continues to step 28.

d) Sensor error: If the air sensing by means of the air mass sensor 7 and/or the pressure sensor 8 in the intake duct 2 is defective, a torque-neutral switchover between the HCCI mode and an operating mode using externally applied (spark) ignition is no longer possible. In order, namely, to avoid a torque surge in a switchover of this type, precise values must be available for the air mass flow or, as the case may be, the pressure in the intake duct 2.

Thus, if the air sensing is defective (step 28), the internal combustion engine will be operated in the homogeneously stoichiometric operating mode. Toward that end it is first determined whether the internal combustion engine is currently in the HCCI operating mode (step 32). If this is the case, a switch is made to the homogeneous stoichiometric operating mode (step 33). If the internal combustion engine is already in an operating mode using externally applied (spark) ignition, the switchover to the HCCI operating mode is prevented (step 34).

e) Faulty ignition or fuel injection: If the ignition (ignition device 4) and/or the fuel injection (injection valve 5) are malfunctioning, that is to say if the corresponding actual values of the ignition and/or injection cannot be brought into line with the predefined set values, a torque-neutral switchover between the HCCI operating mode and an operating mode using externally applied (spark) ignition is likewise no longer possible or at least is made considerably more difficult. In this case too, therefore, the homogeneously stoichiometric operating mode will be activated exclusively (steps 29 and 32 to 34).

f) Ignition failures (misfires) and extremely uneven running: The electronic operation control device 10 typically includes a device 21 for detecting misfires and/or for monitoring the even running of the internal combustion engine. If, for example, misfires or extremely uneven running occur in certain engine speed or load ranges, problem-free operation in the HCCI mode is also no longer guaranteed in said operating ranges. In these cases too, therefore, the HCCI operating mode should be avoided, at least in said engine speed or load ranges (steps 30 and 32 to 34).

g) Safety concept: The electronic operation control device is typically provided with a safety device 22 for monitoring the control functions of the internal combustion engine (safety concept). If the monitoring of the HCCI operating mode no longer works correctly due to a system error, the HCCI operating mode must be avoided. Otherwise reliable operation of the internal combustion engine would no longer be guaranteed. There is the risk, for example, that because of the throttle valve 6 being wide open in the HCCI operating mode an unintended acceleration of the vehicle will occur if, for example, in the HCCI operating mode, as detected by a reasonableness check, the exhaust gas recirculation rate or the injected fuel quantity is not reasonable and the ignition continues to be operated. Thus, if the safety device 22 detects a system error (step 31), the HCCI operating mode is prevented from the outset (step 34).

With the operations described above, either a switchover from the HCCI operating mode to an operating mode using externally applied (spark) ignition was enforced or a switchover to the HCCI operating mode prevented. On the other hand there are exceptional situations in which the HCCI operating mode should be set, which operating mode is then enforced according to the invention. This will now be explained with reference to the flowchart shown in FIG. 3.

a) External exhaust gas recirculation system: If an unintentionally high exhaust gas recirculation rate is produced, for example as a result of an exhaust gas recirculation valve 12 sticking in the open position or a fault in the control of the exhaust gas recirculation valve 12, a controlled operation using externally applied (spark) ignition, in particular a homogeneously stoichiometric operation, is no longer possible because the combustion process becomes unstable. Thus, if the exhaust gas recirculation rate is greater than a limit value (step 35), it is established as a first step whether the internal combustion engine is currently in the HCCI operating mode (step 38). If this is the case, a transition to an operating mode using externally applied (spark) ignition is prevented (step 39). If, on the other hand, the internal combustion engine is in an operating mode using externally applied (spark) ignition, in particular in the homogeneous stoichiometric mode of operation, a switch is made to the HCCI operating mode (step 40).

If, on the other hand, the exhaust gas recirculation rate is less than the limit value, the program proceeds to step 36.

b) Fuel tank ventilation: If the fuel tank venting valve 14 sticks in the open position and the pressure in the intake duct 2 (under light load) is low, the inducted fuel vapors can result in an air-fuel ratio which is less than 1 in spite of the fuel injection being switched off. If this is the case (steps 36 and 37), then the internal combustion engine will be operated in the HCCI mode (steps 38 to 40), assuming this is not already the case anyway.

The invention claimed is:

1. A method for controlling the operation of an HCCI internal combustion engine, comprising:

operating the internal combustion engine in the HCCI operating mode or in an operating mode using externally applied (spark) ignition and during normal operation in a predefined switchover method is switched between the operating modes as a function of predefined operating parameters, wherein irrespective of the predefined switchover method, operation of the internal combustion engine in the HCCI operating mode is prevented if at least one of the following exceptional situations occurs; the vacuum in a vacuum reservoir of an associated braking system is less than a limit value due to an excessively high pressure in the intake duct of the internal combustion engine; the scavenge rate of a fuel tank venting valve of an associated fuel tank venting system of the internal combustion engine is less than a limit value; the temperature of the coolant of a cooling circuit of the internal combustion engine is less than a minimum value; the measurement of the air mass and/or the pressure in the intake duct of the internal combustion engine is defective; the ignition of the air-fuel mixture and/or the fuel injection is defective; misfires or extremely uneven running of the internal combustion engine occur; and a safety device for monitoring the control functions of the internal combustion engine detects a system error.

2. The method as claimed in claim 1, wherein if the internal combustion engine is being operated in the HCCI operating mode and at least one of the events as claimed in claim 1 occurs, the internal combustion engine will be switched over to an operating mode using externally applied (spark) ignition.

3. A method for controlling the operation of an HCCI internal combustion engine, comprising:

operating the internal combustion engine in the HCCI operating mode or in an operating mode using externally applied (spark) ignition and during normal operation in a predefined switchover method is switched between said operating modes as a function of predefined operating parameters, characterized in that, irrespective of the predefined switchover method, operation of the internal combustion engine in the HCCI operating mode is enforced if at least one of the following exceptional situations occurs; the recirculation rate of an external exhaust gas recirculation system of the internal combustion engine is greater than a limit value as a result of a malfunction; and the air-fuel ratio is less than 1 in spite of the fuel injection being switched off.

* * * * *